US008688391B2

(12) United States Patent
Elsner et al.

(10) Patent No.: US 8,688,391 B2

(45) Date of Patent: Apr. 1, 2014

(54) METHOD FOR DETERMINING CONTACT EROSION OF AN ELECTROMAGNETIC SWITCHING DEVICE, AND ELECTROMAGNETIC SWITCHING DEVICE COMPRISING A MECHANISM OPERATING ACCORDING TO SAID METHOD

(75) Inventors: Norbert Elsner, Bubenreuth (DE); Norbert Mitlmeier, Ursensollen (DE); Bernd Trautmann, Erlangen (DE)

(73) Assignee: Siemens Aktiengelleschaft, Munich (DE)

( * ) Notice: Subject to any disclaimer, the term of this patent is extended or adjusted under 35 U.S.C. 154(b) by 735 days.

(21) Appl. No.: 11/992,389

(22) PCT Filed: Sep. 8, 2006

(86) PCT No.: PCT/EP2006/066166

§ 371 (c)(1), (2), (4) Date: Jan. 28, 2009

(87) PCT Pub. No.: WO2007/033913

PCT Pub. Date: Mar. 29, 2007

(65) Prior Publication Data

US 2009/0144019 A1 Jun. 4, 2009

(30) Foreign Application Priority Data

Sep. 21, 2005 (DE) ......................... 10 2005 045 095

(51) Int. Cl.
*G01B 21/02* (2006.01)

(52) U.S. Cl.
USPC ............................................................ 702/34

(58) Field of Classification Search
USPC ............................................................ 702/34
See application file for complete search history.

(56) References Cited

U.S. PATENT DOCUMENTS 5,747,984 A * 5/1998 Amft et al. .................. 324/71.2
2005/0122117 A1 6/2005 Baurand et al.

FOREIGN PATENT DOCUMENTS

| | | | |
|---|---|---|---|
| CH | 643085 | | 5/1984 |
| CN | 1618110 | | 5/2005 |
| DE | 195 35 211 | | 3/1997 |
| DE | 10260248 | A1 | 7/2004 |
| DE | 10260249 | B4 | 7/2005 |
| EP | 0 694 937 | | 1/1996 |
| WO | WO 9908301 | A1 | 2/1999 |
| WO | WO 03054895 | A1 | 7/2003 |
| WO | WO 2004/057634 | A1 | 7/2004 |

OTHER PUBLICATIONS

Chi H. hung, Contact Erosion in Automotive DC Relays, IEEE Transactions on Components, Hybrids, and Manufacturing Technology, vol. 14, No. I, Mar. 1991, p. 101-108.*

(Continued)

*Primary Examiner* — Tung S Lau
(74) *Attorney, Agent, or Firm* — Staas & Halsey LLP

(57) ABSTRACT

In order to determine contact erosion of an electromagnetic switching device, a mechanical parameter is measured which characterizes the time course of the relative movement between the contacts, said movement being caused by an actuator. The point in time when the contacts close is determined by evaluating the time course of the relative movement, and the distance traveled by the contact/s until said point in time or the distance traveled by the actuator from said point in time until reaching the final position thereof is detected at least indirectly and is compared to a stored reference value.

23 Claims, 4 Drawing Sheets

(56) References Cited

OTHER PUBLICATIONS

Chi H. Leung, "Contact Erosion in Automotive DC Relays," IEEE Transactions on Components, Hybrids, and Manufacturing Technology, vol. 14, No. 1, Mar. 1991, pp. 101-108.

Mexican Office Action for corresponding Mexican Patent Application No. MX/a/2008/003888, mailed on Nov. 16, 2010.

German translation of Chinese Office Action for corresponding Chinese Patent Application No. 200680042006.9, mailed on Nov. 16, 2010.

* cited by examiner

METHOD FOR DETERMINING CONTACT EROSION OF AN ELECTROMAGNETIC SWITCHING DEVICE, AND ELECTROMAGNETIC SWITCHING DEVICE COMPRISING A MECHANISM OPERATING ACCORDING TO SAID METHOD

CROSS REFERENCE TO RELATED APPLICATIONS

This application is based on and hereby claims priority to German Application No. 10 2005 045 095.4 filed on Sep. 21, 2005 and PCT Application No. PCT/EP2006/066166 filed on Sep. 8, 2006, the contents of which are hereby incorporated by reference.

BACKGROUND OF THE INVENTION

The invention relates to a method for determining the erosion of contacts of an electromagnetic switching device. In addition, the invention relates to an electromagnetic switching device with a device for determining the erosion of its contacts.

During the switch-on and switch-off operations of an electromagnetic switching device, arcs occur between the closing or opening contacts. These arcs cause erosion of the contacts over the course of time. It is therefore important for the operational reliability of such a switching device to identify the degree of this erosion in order to be able to draw conclusions on the residual life of the switching device and avoid operational faults by replacing the contacts in good time.

EP 0 694 937 B1 has disclosed a method for determining the erosion and therefore the residual life of contacts in switching devices, in which method the so-called contact resilience is determined as a measure for the contact erosion. This contact resilience is the distance which is covered by the magnet armature as the actuator of the switching movement between the beginning of the switch-off operation, i.e. the time at which the magnet armature, which is resting in the end position on a magnet yoke, releases itself therefrom and the time at which the contacts lift off from one another. The time at which the magnet armature lifts off from the magnet yoke is measured by an auxiliary circuit, in which the magnet armature and the magnet yoke form a switch, which is closed if the magnet armature and the magnet yoke are in contact with one another.

As an alternative to this, it is known, for example, from EP 0 878 015 B1, to determine the time at which the magnet armature separates from the magnet yoke of the magnet drive by measuring the voltage at the magnet coil of the magnet yoke.

In both methods, a further auxiliary circuit is required for detecting the time at which the contacts lift off from one another, for example a complex auxiliary circuit which is DC-decoupled from the main circuit with the aid of optocouplers and which detects the occurrence of an arc voltage, which is produced by the arc forming when the contacts lift off from one another.

As an alternative to the methods known from EP 0 694 937 B1 and EP 0 878 015 B1, in which the switch-off operation is used to determine the erosion or the residual life, WO 2004/057634 A1 has disclosed a method and an apparatus for determining the residual life of a switching device, in which method the change in the contact resilience is measured during the switch-on operation, i.e. when the switching contacts are closed by the magnet drive. With this known apparatus, a position encoder is arranged on the magnet armature, which position encoder contains markings, for example in the form of measuring contacts, in at least three positions, with which markings the time profile of the magnet armature movement can be detected. The determination of the position of the magnet armature when the contacts close is determined by computation from the movement sequence of the magnet armature which is detected with the aid of these position markers. For this purpose, a simple algorithm is used as a result of the low number of position markers assuming that the armature acceleration is constant between a time prior to the closing of the contacts and a time which is between the closing time of the contacts and the time at which the magnet armature is positioned onto the magnet yoke. In practice, however, it has been established that, with such an approach, the time at which the contacts close can only be determined with a low amount of accuracy.

SUMMARY

One potential object is to specify a method for determining the erosion of contacts of an electromagnetic switching device, with which method precise determination of the time at which the contacts close and therefore precise determination of the contact erosion is possible. In addition, another potential object is to specify an electromagnetic switching device with a device functioning on the basis of this method.

With a method proposed by the inventors, during the switch-on operation, a mechanical variable, which characterizes the time profile of the relative movement, which is caused by an actuator, between the contacts, is measured and the time at which the contacts close is determined by evaluating the time profile of the relative movement, and the distance covered up to this time by the contacts or that covered from this time by the actuator up to its end position is detected at least indirectly and is compared with a stored reference value.

In this case, the method is based on the consideration that the time profile of the relative movement at the time at which the contacts close is changed significantly as a result of the high spring force of the contact spring which sets in at this time and which brakes the movement of the actuator, with the result that, by analyzing the time profile of the movement, the time at which the contacts meet one another can be determined directly and reliably without an approximation model of the movement sequence being required for this purpose, as is the case with the document WO 2004/057634 A1 mentioned at the outset.

The variable characterizing the movement sequence can be measured directly by measuring the velocity or the acceleration of one of the contacts or both contacts. As an alternative to this, the velocity of an actuator, which causes this relative movement and is coupled mechanically to at least one of the contacts and is actuated by an electromagnetic drive, can also be measured.

If the time profile of the movement is measured by a sensor which is coupled mechanically to the actuator, the measurement can take place using a measurement circuit, which is DC-decoupled from the switched circuit or the circuit of the magnetic drive.

A suitable sensor may be a displacement sensor, a velocity sensor or an acceleration sensor.

If a velocity sensor or an acceleration sensor is used as the sensor, it is particularly easy to determine the time at which the contacts close from this measurement signal. In order in this case to obtain information on the distance covered, its measurement signals still need to be integrated singularly or twofold.

As an alternative to the use of such a sensor, it is also possible to measure the mechanical variable by evaluating an electrical or magnetic variable of the electromagnetic drive which is measured during the switch-on operation.

The inventors also propose an electromagnetic switching device.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
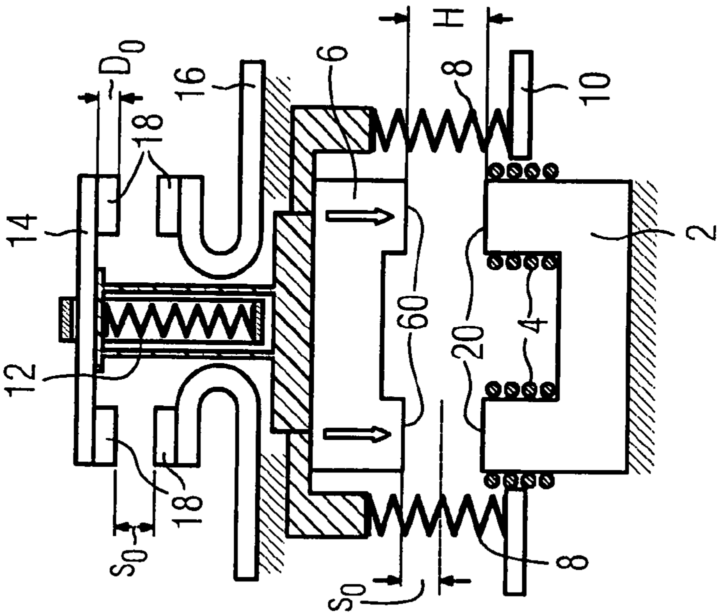
FIGS. 1 to 3 each show an electromagnetic switching device in a basic illustration at various times of the switch-on operation with uneroded contacts.

Reference will now be made in detail to the preferred embodiments of the present invention, examples of which are illustrated in the accompanying drawings, wherein like reference numerals refer to like elements throughout.

As shown in FIG. 1, an electromagnetic switching device, in the example illustrated a contactor, contains a magnet yoke 2, on which two magnet coils 4 are arranged for magnetic excitation purposes. A magnet armature 6, which is associated with the magnet yoke 2, is mounted in a sprung manner by compression springs 8 in a housing 10 (which is only illustrated symbolically) of the switching device. The magnet yoke 2, magnet coil 4 and magnet armature 6 form an electromagnetic drive of the switching device. The magnet armature 6 is connected in a force-fitting manner to a moveable contact link 14 via a contact spring 12. Two stationary contact carriers 16 are associated with the moveable contact link 14. The magnet armature 6 forms the actuator of the magnetic drive for the relative movement between the contact link 14 and the contact carrier 16.

The contact link 14 and the stationary contact carrier 16 are each provided with contact pieces or contacts 18, which when new have a thickness $D_0$. The switching contact formed by the moveable contact link 14 and the stationary contact carrier 16 is located in the open position. In this switched-off state, the contacts 18 are at a spacing $s_0$ and the pole faces 20 and 60 of the magnet yoke or the magnet armature 6 are located at a spacing H.

When the magnet coils 4 are switched on, the magnet armature 6 is set in motion, counter to the action of the compression springs 8, in the direction towards the magnet yoke 2, as is illustrated by the arrows in the drawings.

Figure 2:
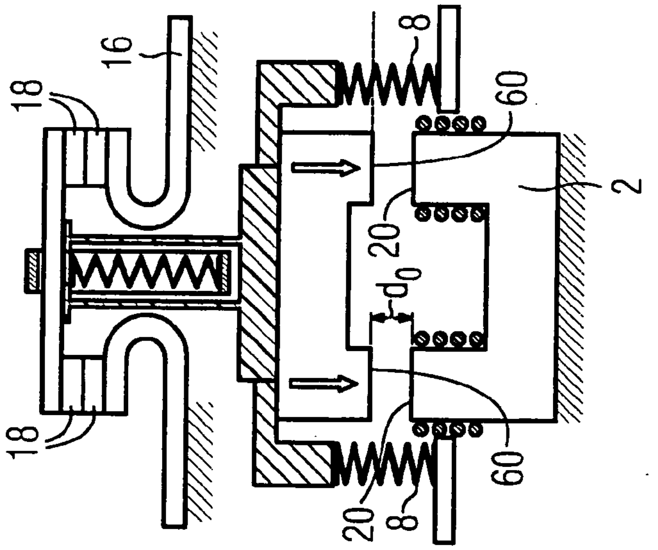

FIG. 2 now shows a situation in which the contacts 18 come into contact with one another for the first time, i.e., the magnet armature 6 has covered a distance $s_0$. At this time, the pole faces 20, 60 are located at a spacing $d_0=H-s_0$. This spacing $d_0$ corresponds to the contact resilience of the switching device with the contacts 18 uneroded. The further closing movement of the magnet armature 6 now takes place counter to the action of the contact spring 12 and the compression spring 8, which is connected in parallel therewith. Since the spring force exerted by the contact spring 12 is considerably greater than the spring force exerted by the compression spring 8, the spring force acting on the magnet armature 6 increases suddenly and brings about a significant change in the course of the closing movement.

Figure 3:
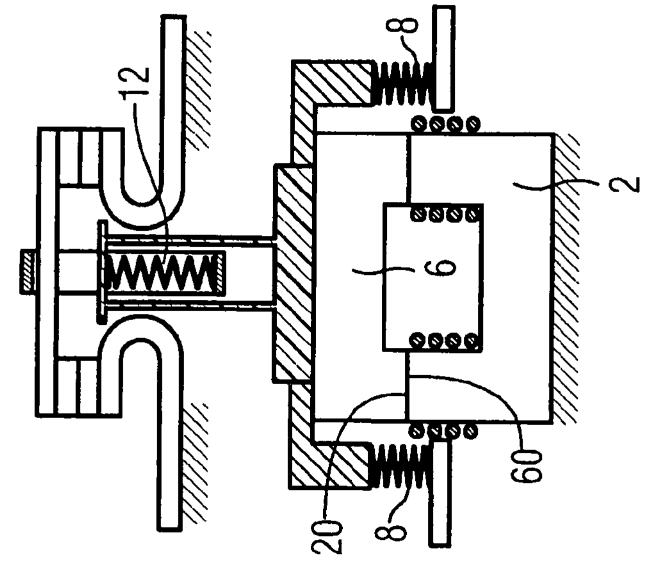

As things proceed, the magnetic force acting on the magnet armature 6 is greater than the spring force exerted by the compression spring 8 and the contact spring 12, and the magnet armature 6 can move further in the direction towards the magnet yoke 2 until it finally, as is illustrated in FIG. 3, rests in an end or rest position with its pole faces 60 on the pole faces 20 of the magnet yoke 2.

Figure 4:
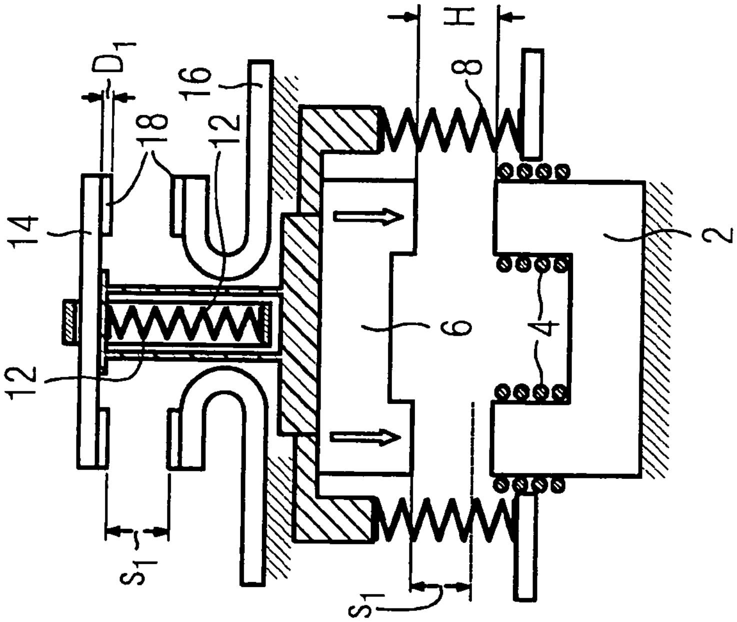
FIGS. 4 to 5 show the electromagnetic switching device at different times of the switch-on operation after a large number of switching cycles when the contacts have suffered significant erosion, FIGS. 6 to 9 each show graphs, in which the voltage across the magnet coil and the current flowing through it, the magnetic force and the spring force, the spacing between the magnet armature and the yoke and the velocity of the magnet armature or its acceleration are in each case plotted over time.

FIG. 4 now illustrates a situation in which the contacts 18 have already been considerably eroded after a large number of switching cycles and only have a thickness of $D_1<D_0$.

Figure 5:
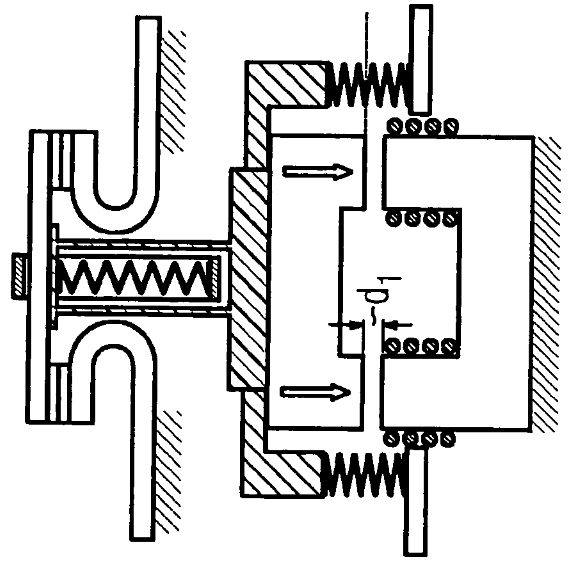

Correspondingly, the contact pieces 18 in the switched-off state are located at a spacing $s_1$ which is considerably greater than the spacing $s_0$ in the new state. If the magnet coils 4 are now excited, i.e. the switch-on operation is introduced, the magnet armature 6 moves with increasing velocity in the direction towards the magnet yoke 2 until, after a distance as shown in FIG. 5 which corresponds to this spacing $s_1$, the contacts 18 come into contact with one another for the first time. This is the case given a spacing $d_1$ of the pole faces 20, 60, for which $d_1=H-s_1$ likewise applies. FIG. 5 now shows that this spacing $d_1$, i.e. the contact resilience as a result of the low thickness $D_1$ of the contacts 18, is reduced significantly in comparison with the contact resilience in the new state.

Figure 6:
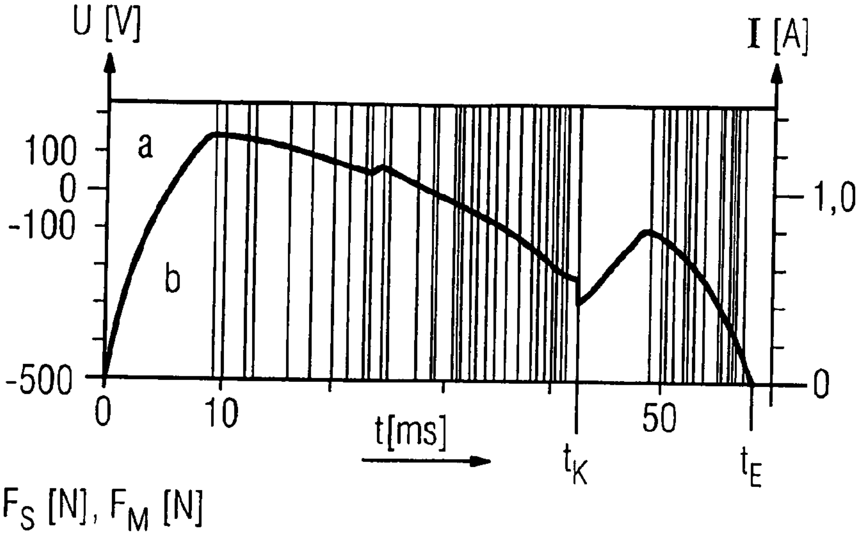

In the graph shown in FIG. 6, the current I (curve a) flowing through the magnet coils and the clocked DC voltage U (curve b) present at the magnet coils are plotted against time t. The example illustrated relates to a switching device which is driven by a method known, for example, from WO 2005/017933 A1, in order to set the closing velocity at which the contacts, on the one hand, and the poles, on the other hand, meet one another by regulating the acceleration of the magnet armature. FIG. 6 now shows that the current I continuously decreases until the time $t_k$ at which the contacts close, in order to briefly rise again after this time $t_k$. This rise is necessary in order to compensate for the suddenly increased spring force, which acts from the time $t_k$, on the magnet armature as a result of a correspondingly higher magnetic force.

Figure 7:
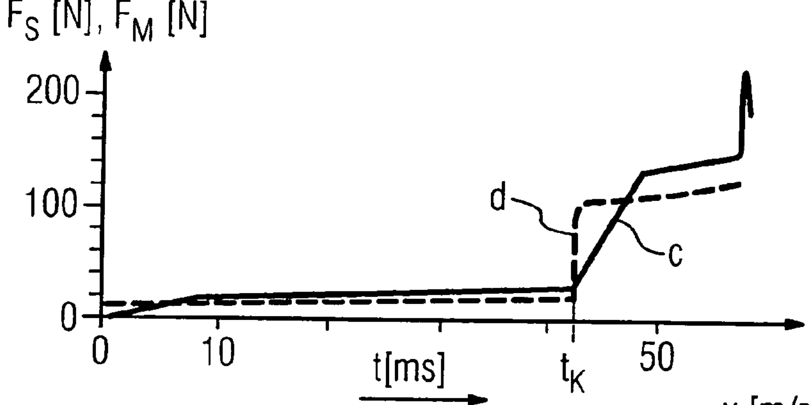

This can clearly be seen in the graph in FIG. 7. In this graph, the magnetic force $F_M$ (curve c) and the spring force $F_s$ (curve d) are plotted against time t. At the time $t_k$ at which the contacts close, the spring force $F_s$ rises suddenly. For a short period, this rise cannot be compensated for by the magnetic force. Only in the further course of things can the magnetic force again exceed the spring force.

Figure 8:
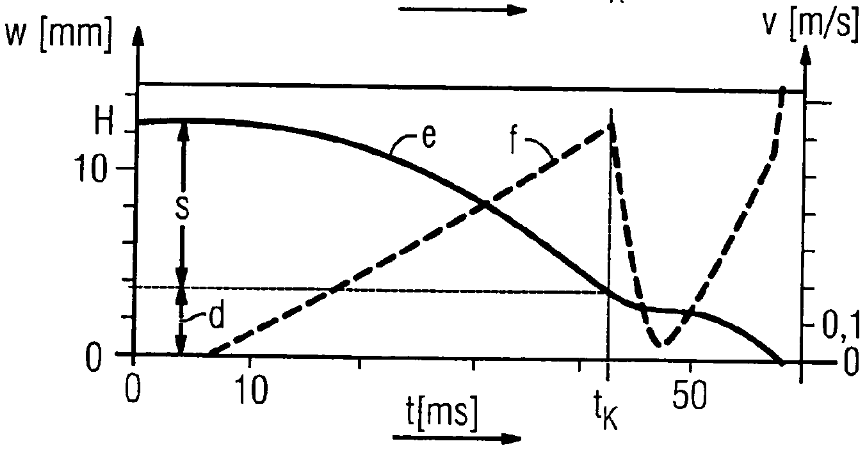

In the graph shown in FIG. 8, the distance s of the magnet armature (curve e) and its velocity v (curve f) are likewise plotted against time t. At the beginning of the switch-on operation, the magnet armature (actuator) is located with its pole faces at the spacing H from the pole faces of the magnet yoke. The velocity v at which the magnet armature moves towards the magnet yoke increases continuously after a certain time delay with an approximately constant acceleration. The reason for this is the abovementioned control of the armature movement, which ensures that the velocity of the magnet armature is not too great. At the closing time $t_k$, i.e.

once the armature and therefore also the contacts have covered a distance w=s, the velocity v decreases rapidly to a minimum value in order then to rise, as a result of the again increasing magnetic force $F_M$, to the desired value of approximately 0.5 m/s. This decrease in the velocity v, which takes place as a result of the suddenly increasing spring force $F_s$, is a significant indication of the closing time $t_k$ of the contacts. This closing time $t_k$ is then the time t at which $v(t+\delta t)<v(t)$ applies. At the closing time $t_k$, the magnet armature is located at the spacing d from the magnet yoke. This spacing d corresponds to the contact resilience present. The magnet armature (actuator), until it reaches its end position, still covers a distance which corresponds to this spacing d.

Figure 9:
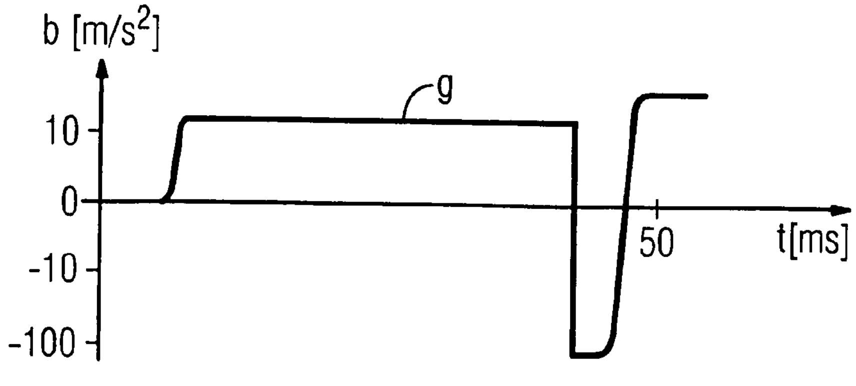

In FIG. 9, the acceleration b of the magnet armature is plotted in a logarithmic scale against time. The curve g shows that the acceleration b rises rapidly to an approximately constant value and experiences a change of mathematical sign at the time at which the contacts close as a result of the decrease in velocity. This change of mathematical sign can be identified particularly easily in the case of an evaluation of the time profile of the acceleration b and can be used to determine the closing time $t_k$.

The graphs illustrated in FIGS. 6 to 9 are used for explaining, by way of example, the physical conditions present when an electromagnetic switching device is switched on. The decrease in the velocity or change in the mathematical sign of the acceleration illustrated in FIGS. 8 and 9 also results when the electromagnetic switching device is operated in an unregulated fashion or on the basis of another regulation method. If the velocity v or the acceleration is now detected, with the aid of a suitable sensor, either directly by a velocity sensor or acceleration sensor, the closing time $t_k$ can be determined particularly easily from its profile. In principle, the closing time $t_k$ can also be derived from a signal measured by a displacement sensor by said signal being differentiated once or twice.

Figure 10:
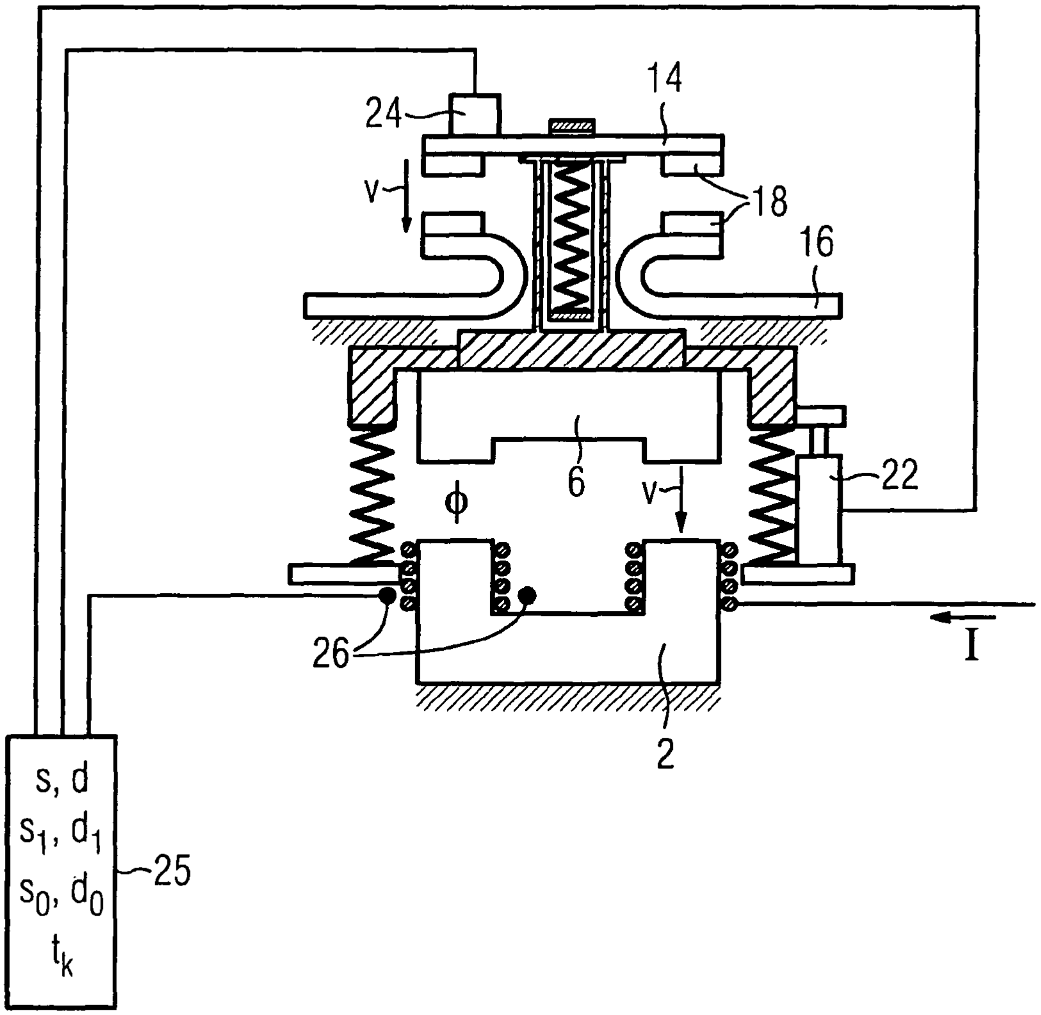
FIG. 10 shows a schematic illustration of a switching device with a device for improved determination of the erosion of the contacts.

As shown in FIG. 10, in the case of one potential embodiment for the proposed switching device, a sensor 22 is coupled directly to the magnet armature 6, which sensor 22 can be in the form of a velocity sensor, acceleration sensor or displacement sensor. This sensor 22 is used to detect the relative movement of the contacts 18 indirectly and to evaluate it in an evaluation device 25. In the evaluation, the time $t_k$ is determined from the change in the acceleration b or the decrease in the velocity v. The remaining distance d (contact resilience) or the distance s covered up until this time $t_k$ can be taken directly from the distance/time profile w(t) of the actuator (magnet armature 6). In this case, the evaluation device 25 can also take on the function of the differentiation or integration of the movement signal produced by the sensor 22.

As an alternative to this, a sensor 24 can be arranged on the moveable contact link 14. In the case of a displacement sensor, the distances $s_0$ and $s_1$ can be measured directly. In the event of a velocity sensor, the velocity v can be determined directly as a function of time. In this case, the closing time $t_k$ is the time at which the movement ends and the velocity v of the moveable contact 18 is equal to zero.

In the exemplary embodiment, the sensors 22, 24 are coupled mechanically to the moving parts, the magnet armature 6 or the moveable contact 18. In principle, however, sensors which function in contactless fashion can also be used, which sensors measure the spacing between the relevant moving part and a stationary housing part.

As an alternative to this, it is also possible to measure the current I flowing through the magnet coils 4 and the magnetic flux $\phi$ with an induction coil 26, in order to determine from this the acceleration acting on the magnet armature 6, by a method known for example from DE 195 44 207 C2.

If the time $t_k$ at which the contacts close is known, this can be used to determine, depending on the sensor used, either directly or indirectly the distance s covered up to this time by the magnet armature 6 and therefore by the contacts 18.

If the distance $s_1$ is known for the example in FIG. 4, it is possible to draw a conclusion directly on the erosion $D_0$-$D_1$ and therefore also on the residual life of the contacts by a comparison with a stored reference value $s_0$. The following relationship results for the erosion $D_0$-$D_1$ $$D_0-D_1=(s_1-s_0)/2$$

with the precondition that the erosion $D_0$-$D_1$ is distributed uniformly over the contacts which are positioned opposite one another. As a mathematical equivalent to this, the spacing $d_1$ of the pole faces from the magnet yoke and the magnet armature can also be calculated from the distance $s_1$. This then results from the difference from the stored value H for the spacing of the pole faces in the open state and the distance covered, where $$d_1=H-s_1.$$

In this case, the following equation applies for the erosion $D_0$-$D_1$ $$D_0-D_1=(d_0-d_1)/2.$$

If the spacing $d_1$ is measured directly as the distance, which is covered by the actuator (magnet armature) from the time $t_k$ up to its end position, the erosion $D_0$-$D_1$ can be calculated directly with the above equation if the spacing $d_0$ (contact resilience) in the case of unused contacts is stored as the reference value.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for determining the erosion of contacts of an electromagnetic switching device, comprising:

measuring a mechanical variable, which characterizes a time profile of relative movement between the contacts, the relative movement between the contacts being caused by movement of an actuator, the mechanical variable being measured during a switch-on operation in which the contacts are closed;

determining a time at which the contacts close by evaluating the time profile of the relative movement;

using the time profile and the time at which the contacts close to monitoring a distance covered during the switch-on operation by either:

determining a distance covered by the contacts from a beginning of the switch-on operation until the time at which the contacts close, or determining a distance covered by the actuator from the time at which the contacts close until an end position of the actuator; and comparing the distance covered with a stored reference value, wherein the mechanical variable is measured by a sensor, which is coupled mechanically to the actuator, and the sensor is selected from the group consisting of a velocity sensor, an acceleration sensor, and a displacement sensor.

2. An electromagnetic switching device to assess erosion, comprising:

a pair of contacts which are moveable relative one another and which are brought into contact with each other after a switch-on operation;

an actuator which moves to cause relative movement between the contacts;

a sensor mechanically coupled to the actuator to measure a mechanical variable and determine a time profile of relative movement between the contacts based on the mechanical variable; and an evaluation device to:

determine a time at which the contacts close by evaluating the time profile of the relative movement;

use the time profile and the time at which the contacts close to monitor a distance covered during the switch-on operation by either:

determining a distance covered by the contacts from a beginning of the switch-on operation until the time at which the contacts close, or determining a distance covered by the actuator from the time at which the contacts close until an end position of the actuator; and compare the distance covered with a stored reference value, wherein the sensor is selected from the group consisting of a velocity sensor, an acceleration sensor and a displacement sensor.

3. An electromagnetic switching device to assess erosion, comprising:

a pair of contacts which are moveable relative one another and which are brought into contact with each other after a switch-on operation;

an actuator which moves to cause relative movement between the contacts;

a sensor mechanically coupled to the actuator to measure a mechanical variable and determine a time profile of relative movement between the contacts based on the mechanical variable; and an evaluation device to:

determine a time at which the contacts close by evaluating the time profile of the relative movement;

use the time profile and the time at which the contacts close to monitor a distance covered during the switch-on operation; and compare the distance covered with a stored reference value, wherein the sensor is selected from the group consisting of a velocity sensor, an acceleration sensor and a displacement sensor.

4. The method as claimed in claim 1 wherein the actuator is moved by an electromagnetic drive, and the mechanical variable is measured by evaluating an electrical or magnetic property, which is measured during the switch-on operation, of the electromagnetic drive.

5. The method as claimed in claim 1, wherein the sensor is selected from the group consisting of an acceleration sensor and a displacement sensor.

6. The method as claimed in claim 1, wherein the sensor is selected from the group consisting of a velocity sensor and a displacement sensor.

7. The method as claimed in claim 1, wherein the sensor is selected from the group consisting of a velocity sensor and an acceleration sensor.

8. The method as claimed in claim 1, wherein the sensor is a velocity sensor.

9. The method as claimed in claim 1, wherein the sensor is an acceleration sensor.

10. The method as claimed in claim 1, wherein the sensor is a displacement sensor.

11. The electromagnetic switching device as claimed in claim 2, wherein the device further comprises an electromagnetic drive to move the actuator, and the sensor measures an electrical or magnetic property of the electromagnetic drive and determines the mechanical variable by evaluating the property.

12. The electromagnetic switching device as claimed in claim 2, wherein the sensor is selected from the group consisting of an acceleration sensor and a displacement sensor.

13. The electromagnetic switching device as claimed in claim 2, wherein the sensor is selected from the group consisting of a velocity sensor and a displacement sensor.

14. The electromagnetic switching device as claimed in claim 2, wherein the sensor is selected from the group consisting of a velocity sensor and an acceleration sensor.

15. The electromagnetic switching device as claimed in claim 2, wherein the sensor is a velocity sensor.

16. The electromagnetic switching device as claimed in claim 2, wherein the sensor is an acceleration sensor.

17. The electromagnetic switching device as claimed in claim 2, wherein the sensor is a displacement sensor.

18. The electromagnetic switching device as claimed in claim 3, wherein the sensor is selected from the group consisting of an acceleration sensor and a displacement sensor.

19. The electromagnetic switching device as claimed in claim 3, wherein the sensor is selected from the group consisting of a velocity sensor and a displacement sensor.

20. The electromagnetic switching device as claimed in claim 3, wherein the sensor is selected from the group consisting of a velocity sensor and an acceleration sensor.

21. The electromagnetic switching device as claimed in claim 3, wherein the sensor is a velocity sensor.

22. The electromagnetic switching device as claimed in claim 3, wherein the sensor is an acceleration sensor.

23. The electromagnetic switching device as claimed in claim 3, wherein the sensor is a displacement sensor.

* * * * *

UNITED STATES PATENT AND TRADEMARK OFFICE

CERTIFICATE OF CORRECTION

PATENT NO. : 8,688,391 B2
APPLICATION NO. : 11/992389
DATED : April 1, 2014
INVENTOR(S) : Elsner et al.

It is certified that error appears in the above-identified patent and that said Letters Patent is hereby corrected as shown below:

On the Title Page Item [73] (Assignee), Line 1, delete "Siemens Aktiengelleschaft," and insert -- Siemens Aktiengesellschaft, --, therefor.

Signed and Sealed this
Twenty-fourth Day of June, 2014

Michelle K. Lee
*Deputy Director of the United States Patent and Trademark Office*